US012619264B2

(12) United States Patent
Iwahori

(10) Patent No.: US 12,619,264 B2
(45) Date of Patent: May 5, 2026

(54) SYSTEM AND METHOD FOR CONTROLLING MANUFACTURING PROCESS OF MOBILE BODY

(71) Applicant: TOYOTA JIDOSHA KABUSHIKI KAISHA, Toyota (JP)

(72) Inventor: Kento Iwahori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 18/746,463

(22) Filed: Jun. 18, 2024

(65) Prior Publication Data

US 2025/0103065 A1 Mar. 27, 2025

(30) Foreign Application Priority Data

Sep. 26, 2023 (JP) ................................. 2023-161806

(51) Int. Cl.
*G06V 20/52* (2022.01)
*G05D 1/221* (2024.01)
*G05D 1/86* (2024.01)
*G05D 107/70* (2024.01)
*G05D 109/10* (2024.01)

(52) U.S. Cl.
CPC .............. *G05D 1/86* (2024.01); *G05D 1/221* (2024.01); *G06V 20/52* (2022.01); *G05D*

*2107/70* (2024.01); *G05D 2109/10* (2024.01); *G06V 2201/08* (2022.01)

(58) Field of Classification Search
CPC ...... G05D 1/86; G05D 1/221; G05D 2107/70; G05D 2109/10; G06V 20/52; G06V 2201/08
See application file for complete search history.

(56) References Cited

U.S. PATENT DOCUMENTS

| 2015/0043781 A1 | 2/2015 | Fukagawa |
| 2017/0320529 A1 | 11/2017 | Nordbruch |

FOREIGN PATENT DOCUMENTS

| JP | H04-372482 A | 12/1992 |
| JP | 2013-050415 A | 3/2013 |
| JP | 2017-538619 A | 12/2017 |
| JP | 6567053 B2 | 8/2019 |
| JP | 2021-062790 A | 4/2021 |
| JP | 2021-105804 A | 7/2021 |
| WO | 2013/133277 A1 | 9/2013 |

*Primary Examiner* — Mathew Franklin Gordon
(74) *Attorney, Agent, or Firm* — SoraIP, Inc.

(57) ABSTRACT

The system includes a control unit that controls a mobile body that can be moved by unmanned driving using sensor information acquired from a sensor, and an inspection unit that inspects a manufacturing state of the mobile body by using at least one of sensor information and electronic component information acquired from an electronic component mounted on the mobile body.

5 Claims, 7 Drawing Sheets

SYSTEM AND METHOD FOR CONTROLLING MANUFACTURING PROCESS OF MOBILE BODY

CROSS-REFERENCE TO RELATED APPLICATION

This application claims priority to Japanese Patent Application No. 2023-161806 filed on Sep. 26, 2023, incorporated herein by reference in its entirety.

BACKGROUND

1. Technical Field

The present disclosure relates to a system and a method.

2. Description of Related Art

A technique for remotely controlling a vehicle to travel in a vehicle manufacturing process is known in the art (e.g., Japanese Unexamined Patent Application Publication (Translation of PCT Application) No. 2017-538619 (JP 2017-538619 A)).

SUMMARY

In a manufacturing process for a mobile body such as a vehicle, when the manufacturing status of the mobile body is visually checked by an operator, it takes time and cost to arrange the operator. In a case of checking by a dedicated facility instead of by an operator, it takes time and cost to arrange the dedicated facility. Therefore, there is a demand for a technique capable of checking the manufacturing status of a mobile body regardless of an operator or a dedicated facility.

The present disclosure can be implemented in the following aspects.

(1) According to a first aspect of the present disclosure, a system is provided. The system includes: a control unit configured to control a mobile body movable by unattended driving by using sensor information acquired from a sensor; and an inspection unit configured to inspect a manufacturing status of the mobile body by using at least one of the sensor information and electronic component information acquired from an electronic component mounted on the mobile body. With the system of this aspect, it is possible to inspect the manufacturing status of the mobile body regardless of an operator or a dedicated facility.

(2) In the system of the above aspect, the control unit may be configured to change a movement destination of the mobile body based on an inspection result from the inspection unit. With the system of this aspect, the movement destination of the mobile body can be varied based on the inspection result.

(3) In the system of the above aspect, the inspection unit may be configured to determine progress of a manufacturing process for the mobile body and inspect an item corresponding to the progress. With the system of this aspect, it is possible to make the inspection based on the progress of the manufacturing process.

(4) In the system of the above aspect, the inspection unit may be configured to identify a component to be mounted on the mobile body and make inspection as to whether the component to be mounted on the mobile body is mounted on the mobile body. With the system of this aspect, it is possible to reduce the occurrence of a case where the mounting of the component on the mobile body is forgotten.

(5) According to a second aspect of the present disclosure, a method is provided. The method includes: controlling a mobile body movable by unattended driving by using sensor information acquired from a sensor; and inspecting a manufacturing status of the mobile body by using at least one of the sensor information and component information acquired from an electronic component mounted on the mobile body. With the method of this aspect, it is possible to inspect the manufacturing status of the mobile body regardless of an operator or a dedicated facility.

The present disclosure can be implemented in various forms other than the system and the method. For example, the present disclosure can be implemented in the form of a device, a computer program, or a recording medium on which the computer program is recorded.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
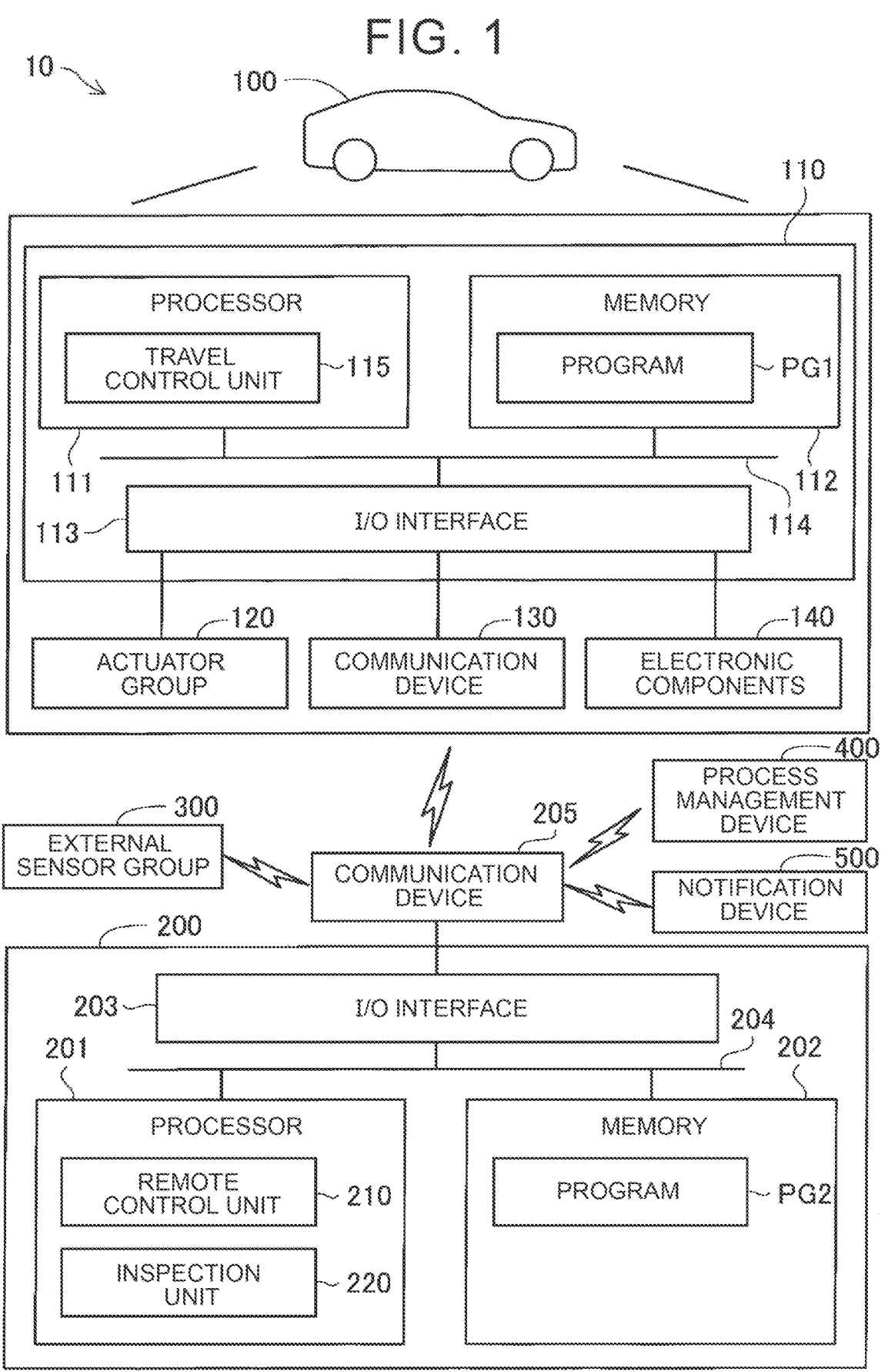
FIG. 1 is an explanatory diagram illustrating a configuration of a system according to a first embodiment.

FIG. 1 is an explanatory diagram illustrating a configuration of a system 10 according to a first embodiment. The system 10 is used for moving a mobile body by unmanned operation in a factory for manufacturing a mobile body, and for inspecting a mobile body in a factory for manufacturing a mobile body. In the present embodiment, the mobile body is the vehicle 100. More specifically, the mobile body is battery electric vehicle (BEV). The mobile body is not limited to battery electric vehicle, and may be, for example, a gasoline-powered vehicle, a hybrid electric vehicle, or a fuel cell electric vehicle. The mobile body is not limited to the vehicle 100, and may be, for example, an electric vertical takeoff and landing machine (a so-called flying vehicle).

Here, the term "unmanned driving" means driving that does not depend on the driving operation of the passenger riding on the vehicle 100. "Driving operation" means an operation related to at least one of "running", "turning", and "stopping" of the vehicle 100. The unmanned driving is realized by automatic or manual remote control using a device located outside the vehicle 100 or by autonomous control of the vehicle 100. A passenger who does not perform a driving operation may be on the vehicle 100 traveling by the unmanned driving. The passenger who does not perform the driving operation includes, for example, a person who is simply seated on the seat of the vehicle 100 or a person who is on the vehicle 100 and performs an action different from the driving operation. The action different from the driving operation includes, for example, an assembling operation of a component to the vehicle 100, an inspection of the vehicle 100, an operation of switches provided in the vehicle 100, and the like. Driving by the driver's driving operation may be referred to as "manned driving".

In the present embodiment, the system 10 includes a vehicle 100 that can be moved by remote control, a server device 200 that remotely controls the vehicle 100, an external sensor group 300 installed in a factory, a process management device 400 that manages the manufacture of the vehicle 100 in the factory, and a notification device 500 for notifying that an abnormality has occurred in the factory.

The vehicle 100 includes a vehicle control device 110 for controlling each unit of the vehicle 100, an actuator group 120 driven under the control of the vehicle control device 110, a communication device 130 for communicating with the server device 200 by wireless communication, and an electronic component 140. The actuator group 120 includes at least one actuator. In the present embodiment, the actuator group 120 includes an actuator of a driving device for accelerating the vehicle 100, an actuator of a steering device for changing a traveling direction of the vehicle 100, and an actuator of a braking device for decelerating the vehicle 100. The driving device includes a battery, a traveling motor driven by electric power of the battery, and wheels rotated by the traveling motor. The actuator of the drive device includes a traveling motor. The electronic component 140 is, for example, a measurement unit for measuring the number of revolutions of a wheel and the air pressure of a rubber tire mounted on the wheel. The electronic component 140 may be a measurement unit for measuring a physical quantity other than the number of revolutions of the wheels and the pneumatic pressure of the rubber tire. The electronic component 140 is not limited to the measurement unit, and may be, for example, an in-vehicle camera, a car navigation device, or the like.

The vehicle control device 110 includes a computer including a processor 111, a memory 112, an input/output interface 113, and an internal bus 114. The processor 111, the memory 112, and the input/output interface 113 are bidirectionally communicably connected to each other via an internal bus 114. An actuator group 120, a communication device 130, and an electronic component 140 are connected to the input/output interface 113.

The processor 111 functions as the travel control unit 115 by executing a computer program PG1 stored in advance in the memory 112. The travel control unit 115 controls the actuator group 120. When the occupant is on the vehicle 100, the travel control unit 115 can cause the vehicle 100 to travel by controlling the actuator group 120 in accordance with the operation of the occupant. The travel control unit 115 can cause the vehicle 100 to travel by controlling the actuator group 120 in accordance with the travel control signal received from the server device 200, regardless of whether or not the occupant is on the vehicle 100.

The server device 200 includes a computer including a processor 201, a memory 202, an input/output interface 203, and an internal bus 204. The processor 201, the memory 202, and the input/output interface 203 are bidirectionally communicably connected to each other via an internal bus 204. A communication device 205 for communicating with the vehicle 100 by wireless communication is connected to the input/output interface 203. In the present embodiment, the communication device 205 can communicate with the external sensor group 300, the process management device 400, and the notification device 500 by wired communication or wireless communication.

The processor 201 functions as a remote control unit 210 and an inspection unit 220 by executing a computer program PG2 stored in advance in the memory 202. The remote control unit 210 performs remote control of the vehicle 100 using information output from the external sensor group 300. The inspection unit 220 inspects the manufacturing state of the vehicle 100 using at least one of the information output from the external sensor group 300 and the information output from the electronic component 140. The manufacturing state includes a state of the vehicle 100 and a state of a manufacturing process of the vehicle 100. The state of the vehicle 100 includes, for example, the presence or absence of defective attachment of components, the presence or absence of defective appearance, and the like. Poor mounting includes forgetting to mount a component, having a component mounted in an insufficient condition that may cause the component to fall off, and having a wrong component mounted. Poor appearance includes scratches, coating unevenness, and the like. The state of the manufacturing process of the vehicle 100 includes, for example, whether or not the work is performed by an appropriate procedure or method, whether or not the work is performed before the start of the work, whether or not the work is being performed, whether or not the work is completed, variations in the work time, whether or not the work is performed by a qualified person, and the like. The inspection unit 220 performs an inspection of items corresponding to the progress of the manufacturing process of the vehicle 100. In other words, the inspection unit 220 performs an inspection of an item according to the stage at which the vehicle 100 is manufactured.

The external sensor group 300 includes at least one external sensor. The external sensor is a sensor located outside the vehicle 100. In the present embodiment, the external sensor is a camera provided in a factory. The external sensor includes a communication device (not shown) and can communicate with the server device 200 by wired communication or wireless communication.

The process management device 400 manages the overall manufacturing process of the vehicle 100 in the factory. The process management device 400 includes at least one computer. The process management device 400 includes a database in which various types of information of the vehicle 100 are recorded. The various kinds of information recorded in the database include information on the identification number of the vehicle 100, the vehicle type, the contents of each manufacturing process, the progress of the manufacturing process, and the components mounted in each manufacturing process. The process management device 400 includes a communication device (not shown), and can communicate with the server device 200 and various facilities of the factory by wired communication or wireless communication.

The notification device 500 is a device for notifying an administrator of the system 10 and an operator of the factory that an abnormality has occurred in the factory. In the following description, an administrator of the system 10 or an operator of a factory is referred to as an administrator or the like. The notification device 500 is, for example, a warning buzzer provided in a factory or a warning lamp provided in a factory. The notification device 500 may be a tablet terminal carried by an administrator or the like. The notification device 500 includes a communication device (not shown), and can communicate with the server device 200 by wired communication or wireless communication.

Figure 2:
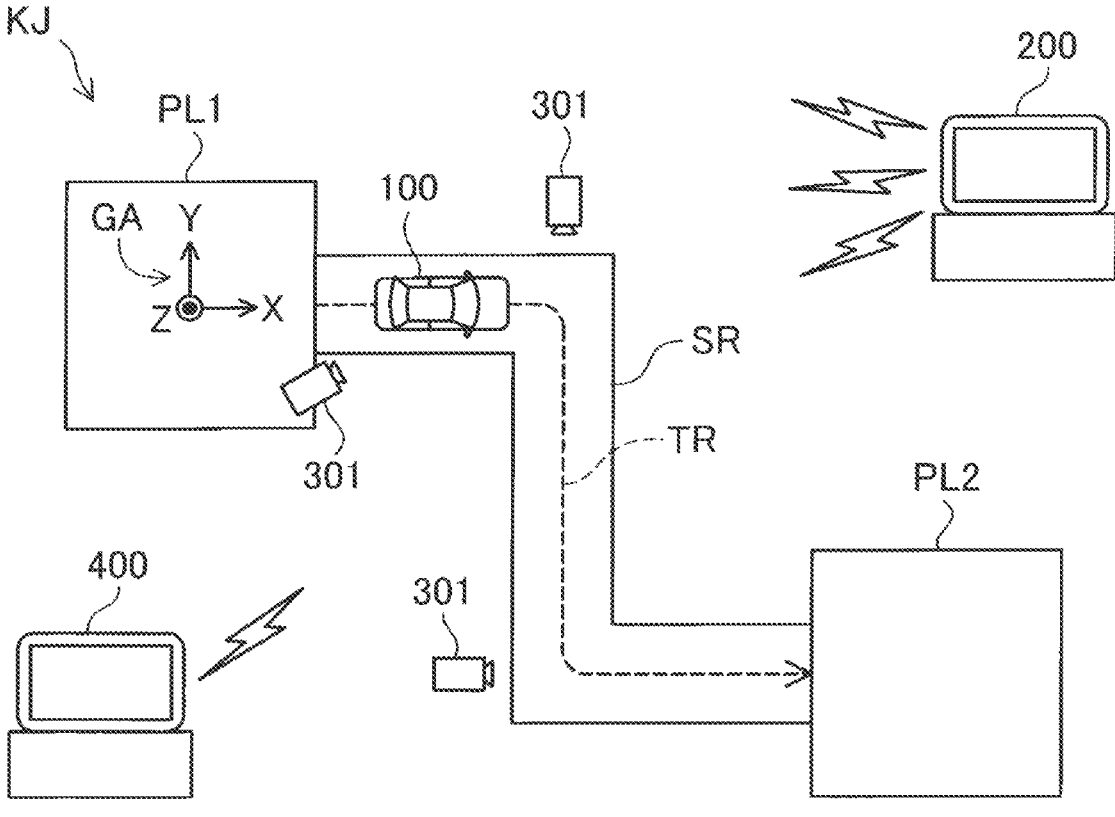
FIG. 2 is an explanatory view showing a state in which a vehicle travels by remote control in a factory.

FIG. 2 is an explanatory diagram illustrating a state in which the vehicle 100 travels by remote control in the factory KJ. In FIG. 2, the coordinate axis GA of the global coordinate system in the factory KJ and the ideal route TR on which the vehicle 100 should travel are illustrated. In the present embodiment, the factory KJ includes a first location PL1 and a second location PL2. The first location PL1 and the second location PL2 are connected by a traveling path SR on which the vehicle 100 can travel. A plurality of external sensors 301 constituting the external sensor group 300 are installed around the traveling path SR. In the present embodiment, the first location PL1 is a location where the assembly of the vehicle 100 is performed, and the second location PL2 is a location where the final inspection of the vehicle 100 is performed. At least the vehicle control device 110, the actuator group 120, and the communication device 130 are attached to the vehicle 100 at the time of assembly in the first location PL1. Accordingly, the vehicle 100 is ready to travel by remote control when assembled at the first location PL1. The vehicle 100 assembled in the first location PL1 is moved from the first location PL1 to the second location PL2 by being remotely controlled by the server device 200. The vehicle 100 that passed the final test in the second location PL2 is shipped from the factory KJ.

Figure 3:
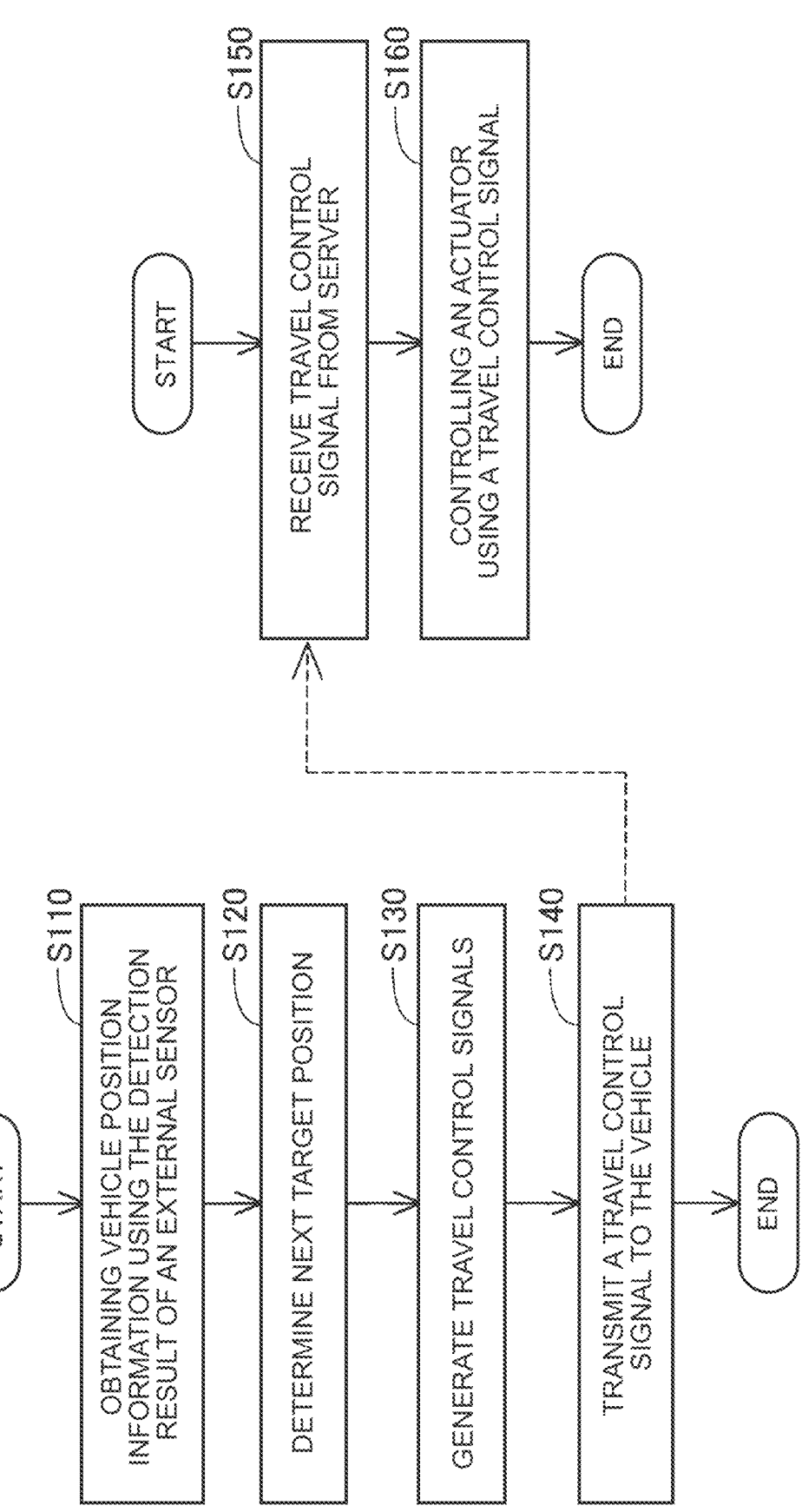
FIG. 3 is a flowchart showing the contents of the unmanned driving process according to the first embodiment.

FIG. 3 is a flowchart showing the contents of the unmanned driving process according to the present embodiment. In the present embodiment, the unmanned driving process is executed by the remote control unit 210 of the server device 200 (the process of the flowchart on the left side in FIG. 3) and the travel control unit 115 of the vehicle 100 (the process of the flowchart on the right side in FIG. 3). The unmanned driving process is started, for example, when a predetermined start operation is performed by an administrator or the like. Prior to the start of the unmanned driving process, the remote control unit 210 acquires the identification number of the vehicle 100 to be remotely controlled. For example, a two-dimensional code in which the identification number of the vehicle 100 is recorded is attached to the vehicle 100. When the worker of the factory KJ reads the two-dimensional code attached to the vehicle 100 by the reading device, the identification number of the vehicle 100 is transmitted from the reading device to the server device 200.

When the unmanned driving process is started, in S110, the remote control unit 210 acquires the position information of the vehicle 100 using the detection result outputted from the external sensor 301 located outside the vehicle 100. In the present embodiment, the position information of the vehicle 100 includes the position and orientation of the vehicle 100 in the global coordinate system of the factory KJ. In the present embodiment, the external sensor 301 is a camera installed in a factory KJ, and images are outputted from the external sensor 301 as a detected result. The position and orientation of the external sensor 301 are adjusted in advance. The remote control unit 210 acquires the position and orientation of the vehicle 100 KJ to the factory by using the images acquired from the external sensor 301.

With respect to the method of acquiring the position of the vehicle 100, for example, the remote control unit 210 detects the outline of the vehicle from the image, calculates the coordinates of the positioning point of the vehicle 100 in the coordinate system of the image, and converts the calculated coordinates into the coordinates in the global coordinate system. Thus, the remote control unit 210 can acquire the position of the vehicle 100. The external shape of the vehicle 100 included in the image can be detected by, for example, inputting an image into a detection model utilizing artificial intelligence. Examples of the detection model include a learned machine learning model learned to realize either semantic segmentation or instance segmentation. As the machine learning model, for example, a convolutional neural network learned by supervised learning using a learning dataset can be used. In the following explanation, a convolutional neural network is referred to as a CNN. The training data set includes, for example, a plurality of training images including the vehicle 100 and a correct label indicating which of the regions in the training image is the region indicating the vehicle 100 and the region indicating other than the vehicle 100. When CNN is learned, the parameters of CNN are preferably updated by back propagation so as to reduce the error between the output and the correct label. With respect to the method of acquiring the orientation of the vehicle 100, the remote control unit 210 calculates the movement vector of the vehicle 100 from the positional change of the feature point of the vehicle 100 between the frames of the image using, for example, the optical flow method, and estimates the orientation of the vehicle 100 based on the orientation of the movement vector. Thus, the remote control unit 210 can acquire the orientation of the vehicle 100.

In S120, the remote control unit 210 determines a target position to which the vehicle 100 is to be directed next. In the present embodiment, the target position is represented by the coordinates of X, Y, Z in the global coordinate system. In the memory 202, an ideal route on which the vehicle 100 should travel is stored in advance. The route is represented by a node indicating a starting point, a node indicating a passing point, a node indicating a destination, and a link connecting the respective nodes. The remote control unit 210 uses the position information of the vehicle 100 and the ideal route to determine a target position to which the vehicle 100 is to be directed next. The remote control unit 210 determines the target position on the ideal route ahead of the current position of the vehicle 100.

At S130, the remote control unit 210 generates a travel control signal for causing the vehicle 100 to travel toward the determined target position. In the present embodiment, the travel control signal includes the acceleration and the steering angle of the vehicle 100 as parameters. The remote control unit 210 calculates the traveling speed of the vehicle 100 from the transition of the position of the vehicle 100, and compares the calculated traveling speed with a predetermined target speed of the vehicle 100. When the traveling speed is lower than the target speed, the remote control unit 210 determines the acceleration so that the vehicle 100 accelerates. When the traveling speed is higher than the target speed, the remote control unit 210 determines the acceleration so that the vehicle 100 decelerates. When the vehicle 100 is located on the ideal route, the remote control unit 210 determines the steering angle so that the vehicle 100 does not deviate from the ideal route. When the vehicle 100 is not located on the ideal route, in other words, when the vehicle 100 deviates from the ideal route, the remote control unit 210 determines the steering angle so that the vehicle 100 returns to the ideal route.

At S140, the remote control unit 210 transmits the generated travel control signal to the vehicle 100. The remote control unit 210 repeats acquisition of position information of the vehicle 100, determination of a target position, generation of a travel control signal, and transmission of a travel control signal at a predetermined cycle.

In S150, the travel control unit 115 of the vehicle 100 receives a travel control signal from the server device 200. In S160, the travel control unit 115 controls the actuator group 120 by using the received travel control signal, thereby causing the vehicle 100 to travel at the acceleration and the steering angle represented by the travel control signal. The travel control unit 115 repeats the reception of the travel control signal and the control of the actuator group 120 at a predetermined cycle. According to the system 10 of the present embodiment, since the vehicle 100 can be driven by remote control, the vehicle 100 can be moved without using a conveyance facility such as a crane or a conveyor.

Figure 4:
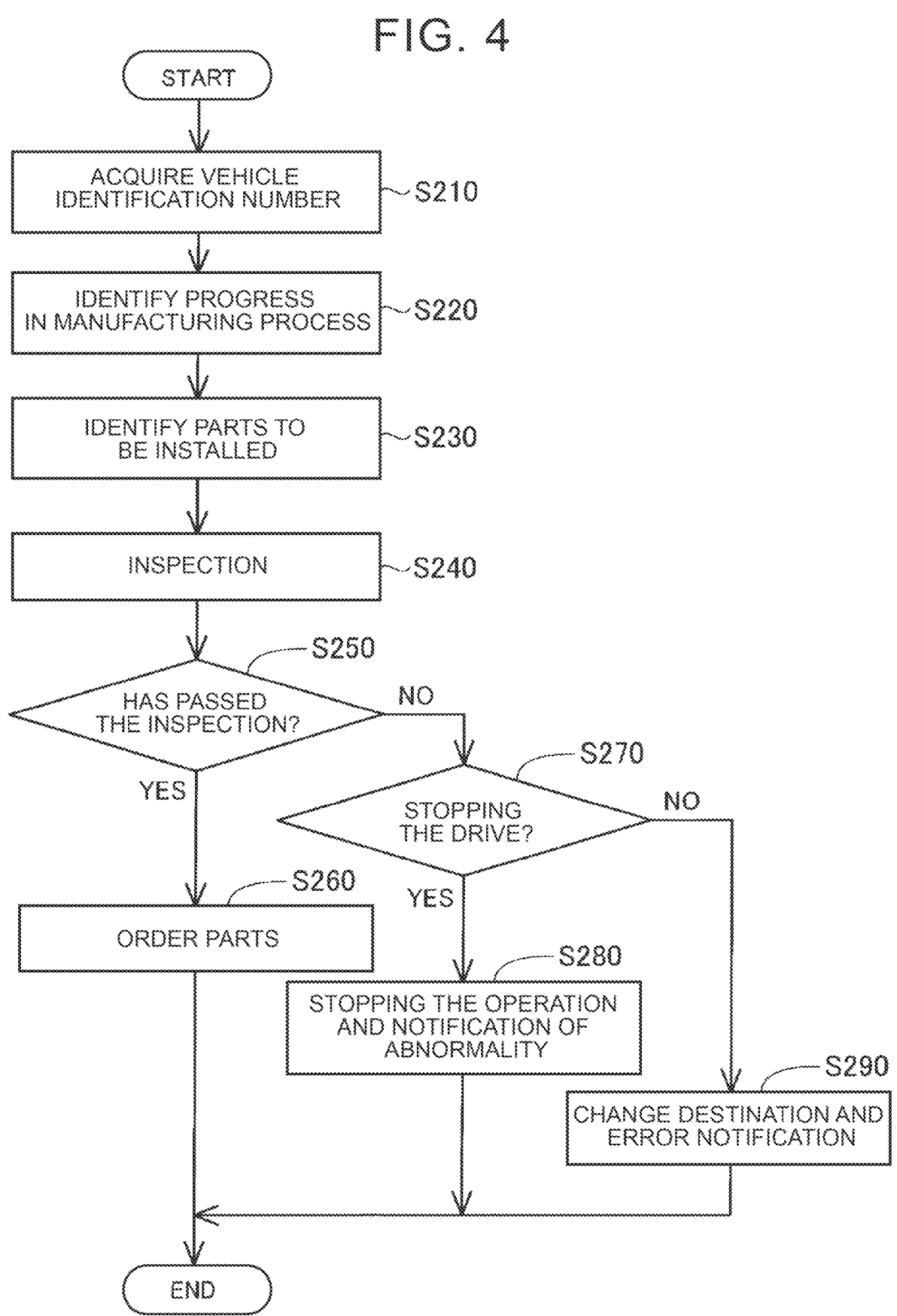
FIG. 4 is a flowchart showing the contents of the inspection process.

FIG. 4 is a flowchart illustrating the contents of the inspection process. The inspection process is executed by the inspection unit 220 of the server device 200. The inspection process is started, for example, when the vehicle 100 to be inspected arrives at a predetermined position. In the following description, the vehicle 100 to be inspected is referred to as a target vehicle 100. When the inspection process is started, the inspection unit 220 acquires the identification number of the target vehicle 100 in S210. In the present embodiment, the remote control unit 210 grasps the identification number of the target vehicle 100 moved to the position where the inspection process is executed. The inspection unit 220 acquires the identification number of the target vehicle 100 from the remote control unit 210.

In S220, the inspection unit 220 specifies the progress of the manufacturing process of the target vehicle 100. In the present embodiment, since it is predetermined at which position in the factory KJ which operation is to be performed on the target vehicle 100, the progress of the manufacturing process of the target vehicle 100 can be grasped from the current position of the target vehicle 100. The remote control unit 210 sequentially transmits the position information of the target vehicle 100 to the process management device 400. The process management device 400 grasps the progress of the manufacturing process from the current location of the target vehicle 100, and updates the progress of the manufacturing process of the target vehicle 100 recorded in the database. The inspection unit 220 acquires information from the process management device 400 by using the identification number of the target vehicle 100, thereby specifying the progress of the manufacturing process of the target vehicle 100 at the present time.

In S230, the inspection unit 220 specifies a component to be mounted on the target vehicle 100 at the present time. In the present embodiment, in the database of the process management device 400, information on components mounted on the target vehicle 100 in each manufacturing process is recorded in association with the identification number of the target vehicle 100. In other words, the process management device 400 knows at which stage in the manufacturing process, which components are to be attached to the target vehicle 100. The inspection unit 220 acquires information from the process management device 400 by using the identification number of the target vehicle 100 and the progress of the manufacturing process, thereby specifying a component to be attached to the target vehicle 100 at the present time.

In S240, the inspection unit 220 inspects the manufacturing status of the target vehicle 100 using at least one of the information acquired from the external sensor group 300 and the information acquired from the electronic component

140. In the following description, the information acquired from the external sensor group 300 is referred to as sensor information, and the information acquired from the electronic component 140 is referred to as electronic component information. In the present embodiment, the inspection unit 220 inspects the manufacturing state of the target vehicle 100 using the sensor information and the electronic component information. In the present embodiment, the inspection unit 220 inspects whether or not a component to be mounted on the target vehicle 100 is properly mounted on the target vehicle 100 at the present time. The inspection unit 220 acquires an image as sensor information from the external sensor group 300. The inspection unit 220 analyzes the image acquired from the external sensor group 300 to detect a mounting failure of a component in the target vehicle 100. The inspection unit 220 acquires, as electronic component information, a communication confirmation result between the vehicle control device 110 and the electronic component 140 from the target vehicle 100. The inspection unit 220 analyzes the communication confirmation result acquired from the target vehicle 100 to detect a mounting failure of the electronic component 140 in the target vehicle 100. Even when the mounting failure of the electronic component 140 cannot be detected from the image of the external sensor group 300, the mounting failure of the electronic component 140 can be detected from the communication confirmation result. Of course, when the mounting failure of the electronic component 140 can be detected from the external sensor information, the inspection unit 220 may detect the mounting failure of the electronic component 140 using the external sensor information.

In S250, the inspection unit 220 determines whether or not the inspection is successful. In the present embodiment, the inspection unit 220 determines that the detection result is acceptable when a mounting failure is not detected in an inspection using the external sensor information and the electronic component information. The inspection unit 220 determines that a mounting failure is detected in an inspection using the external sensor information and the electronic component information.

When it is determined that the component is passed in S250, the inspection unit 220 generates the order data of the component so that the same component as the component is replenished at the location where the component is mounted on the target vehicle 100 in S260, and transmits the order data to the process management device 400. Thereafter, the inspection unit 220 ends the inspection process.

When it is determined that the vehicle is rejected in S250, the inspection unit 220 determines whether or not to stop the travel of the target vehicle 100 in S270. In the present embodiment, the inspection unit 220 determines whether or not to stop the travel of the target vehicle 100 according to the inspection result of the target vehicle 100. For example, the inspection unit 220 determines that the traveling of the target vehicle 100 is to be stopped when a defective attachment of a predetermined component registered in a predetermined list is detected. For example, the inspection unit 220 acquires the list from the process management device 400.

When it is determined in S270 that the traveling of the target vehicle 100 is to be stopped, the inspection unit 220 instructs the remote control unit 210 to stop the traveling of the target vehicle 100 in S280. Upon receiving the instruction from the inspection unit 220, the remote control unit 210 transmits a travel control signal for stopping the target vehicle 100 to the target vehicle 100, and stops the travel of the target vehicle 100. Further, in the present embodiment, the inspection unit 220 uses the notification device 500 to notify the administrator or the like that the travel of the target vehicle 100 has been stopped. Thereafter, the inspection unit 220 ends the inspection process.

When it is not determined in S270 that the traveling of the target vehicle 100 is to be stopped, the inspection unit 220 instructs the remote control unit 210 to change the moving destination of the target vehicle 100 in S290. For example, the inspection unit 220 instructs the remote control unit 210 to change the destination of the target vehicle 100 from the place for performing the next work to the place for performing the repair. Upon receiving the instruction from the inspection unit 220, the remote control unit 210 changes the destination of the target vehicle 100 and moves the target vehicle 100 to the changed destination. Further, in the present embodiment, the inspection unit 220 uses the notification device 500 to notify the administrator or the like that the destination of the target vehicle 100 has been changed. Thereafter, the inspection unit 220 ends the inspection process.

Figure 5:
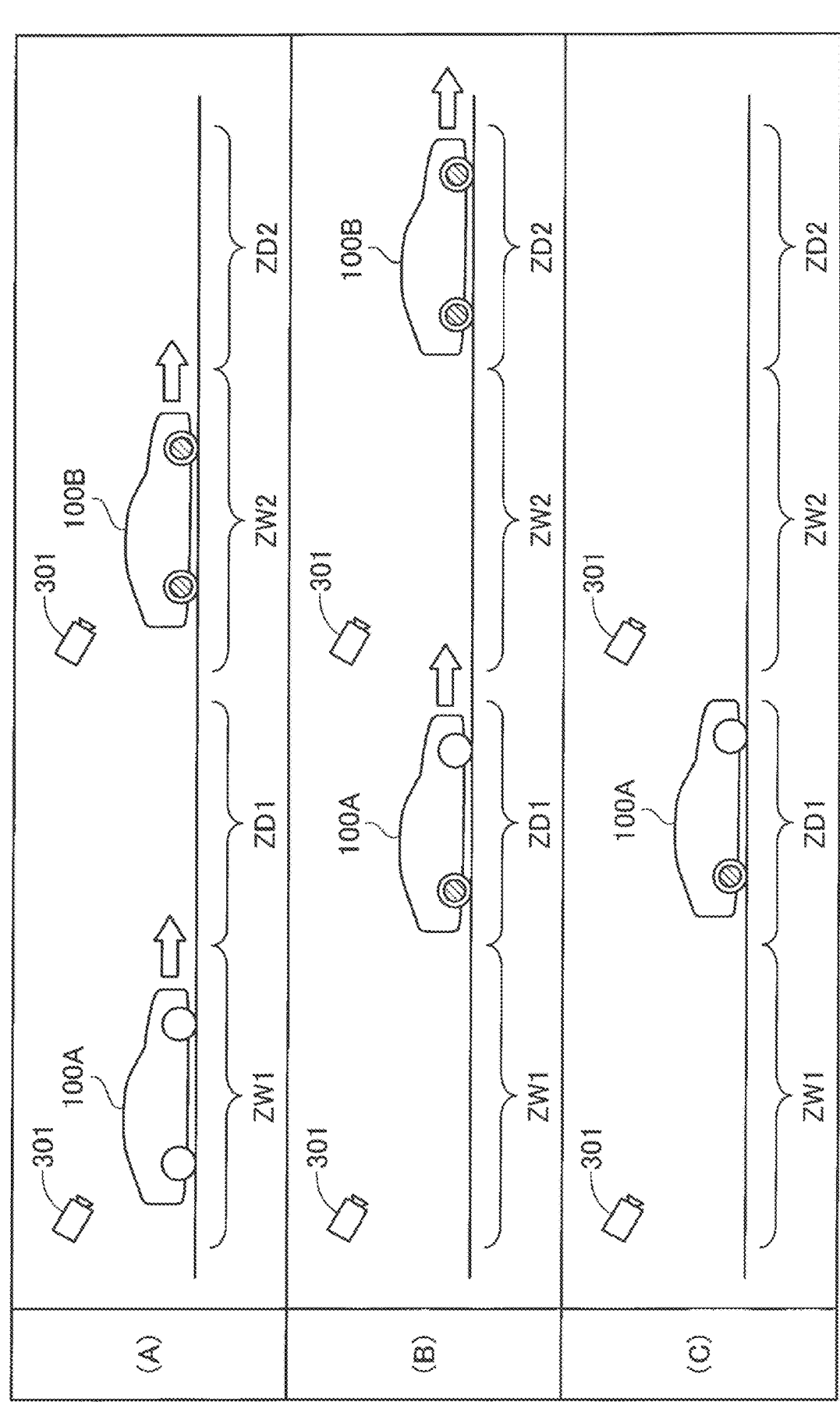
FIG. 5 is an explanatory view showing a state of inspection by inspection processing.

FIG. 5 is an explanatory diagram illustrating a state of inspection by inspection processing. In the present embodiment, the in-process inspection of the assembly process is performed in the first location PL1 by the inspection process executed by the inspection unit 220. The first location PL1 is provided with a first work area ZW1, a first inspection area ZD1, a second work area ZW2, and a second inspection area ZD2. FIG. 5 shows two vehicles 100A, 100B. When two vehicles 100A, 100B are described without particular distinction, they are simply referred to as a vehicle 100. The respective vehicles 100A, 100B move the first work area ZW1, the first inspection area ZD1, the second work area ZW2, and the second inspection area ZD2 in this order by remote control by the remote control unit 210.

As illustrated in (A) of FIG. 5, when the vehicle 100A moves to the first work area ZW1, an operation of attaching the measurement unit and the wheel cover to the front wheel and the rear wheel of the vehicle 100A is performed by the worker or the robotic arm in the first work area ZW1. The measurement unit is an electronic component 140. In FIG. 5, the wheel cover is represented by hatching. Since it is difficult to mount the measurement unit and the wheel cover when the front wheel and the rear wheel of the vehicle 100A are rotating, the vehicle 100A may be stopped for a predetermined time in the first work area ZW1.

As illustrated in (B) of FIG. 5, the manufacturing status of the vehicle 100A is inspected by the inspection unit 220 executing the inspection process when the vehicle 100A passes through the first inspection area ZD1. In the inspection in the first inspection area ZD1, the defective mounting of the measurement unit and the wheel cover in the vehicular 100A is inspected.

As illustrated in (C) of FIG. 5, since the wheel cover is not attached to the front wheel of the vehicle 100A, the vehicle 100A fails the inspection in the first inspection area ZD1. In (C) of FIG. 5, the moving of the vehicular 100A that has failed the inspection in the first inspection area ZD1 is stopped. When the inspection in the first inspection area ZD1 is passed, the vehicle 100A moves to the second work area ZW2, and the vehicle 100A is mounted in the second work area ZW2 with a component that differs from the component that is mounted in the first work area ZW1. The manufacturing status of the vehicle 100A is inspected by the inspection unit 220 executing the inspection process even when the vehicle 100A passes through the second inspection area ZD2. In the inspection in the second inspection area ZD2, it is inspected whether a component to be mounted on the vehicle 100A is mounted in the second work area ZW2.

According to the system 10 of the present embodiment described above, the inspection unit 220 inspects the manufacturing state of the vehicle 100 using at least one of the sensor information acquired from the external sensor group 300 and the electronic component information acquired from the vehicle 100. Since the external sensor group 300 is used for unmanned driving of the vehicle 100, it is not a facility dedicated to inspection of the vehicle 100. Therefore, it is possible to inspect the manufacturing state of the mobile body without relying on the worker or the dedicated equipment.

Further, in the present embodiment, the remote control unit 210 stops the movement of the vehicle 100 that has failed the inspection by the inspection unit 220 or changes the movement destination. By stopping the movement of the vehicle 100 that has failed the inspection, it is possible to prevent the vehicle 100 that has failed the inspection from moving to the next work area. By changing the transfer destination of the vehicle 100 that has failed the inspection, the vehicle 100 that has failed the inspection can be moved to the repair place without using a transfer facility such as a crane or a conveyor.

Further, in the present embodiment, the inspection unit 220 specifies the progress of the manufacturing process of the vehicle 100 and inspects items corresponding to the progress of the manufacturing process. Therefore, it is possible to perform an inspection according to the progress of the manufacturing process.

Further, in the present embodiment, the inspection unit 220 specifies a component to be mounted on the vehicle 100, and inspects whether or not a component to be mounted on the vehicle 100 is mounted on the vehicle 100. Therefore, it is possible to prevent a component from being forgotten to be attached to the vehicle 100.

B. Second Embodiment

Figure 6:
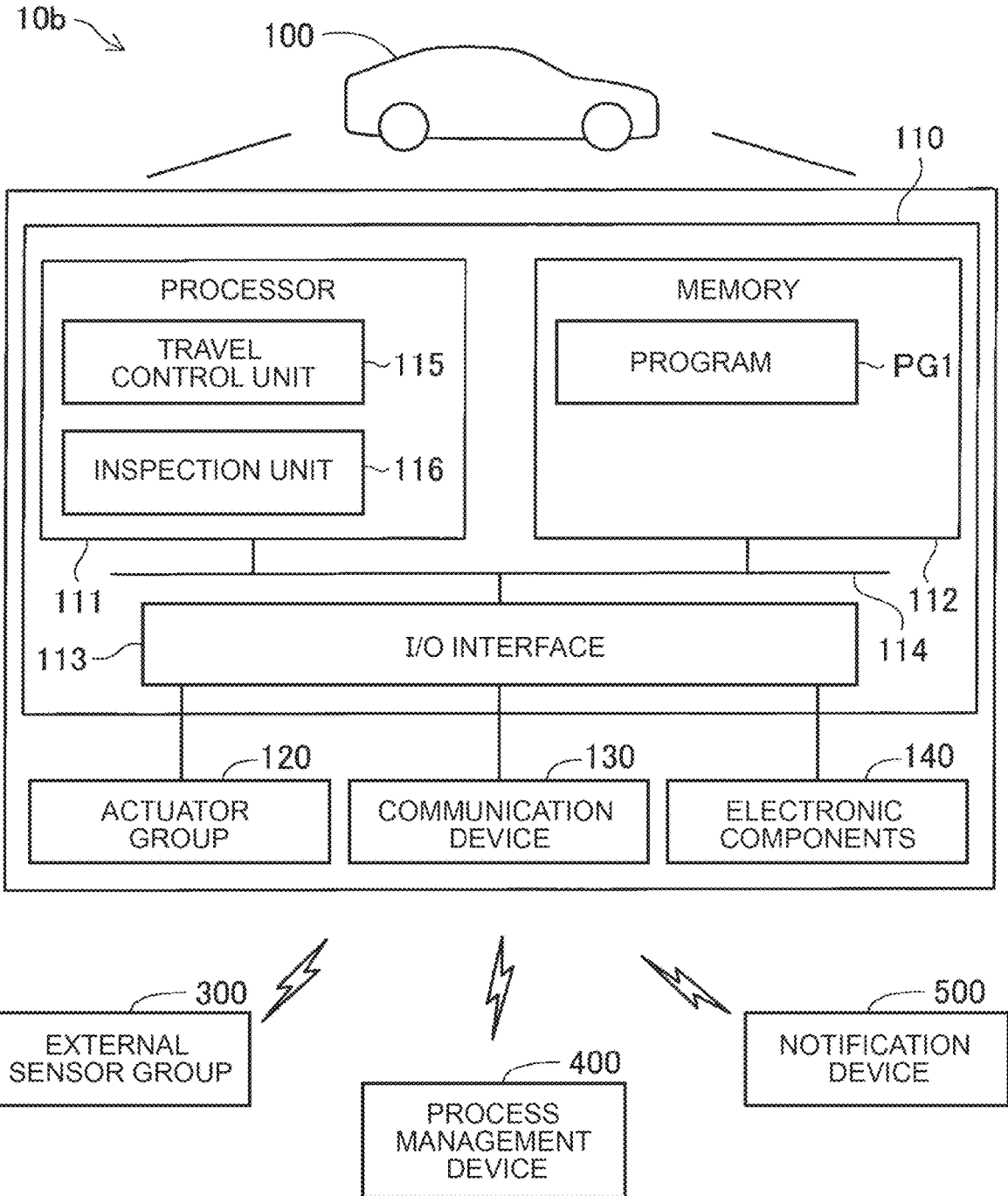
FIG. 6 is an explanatory view showing a configuration of a system according to a second embodiment.
Figure 7:
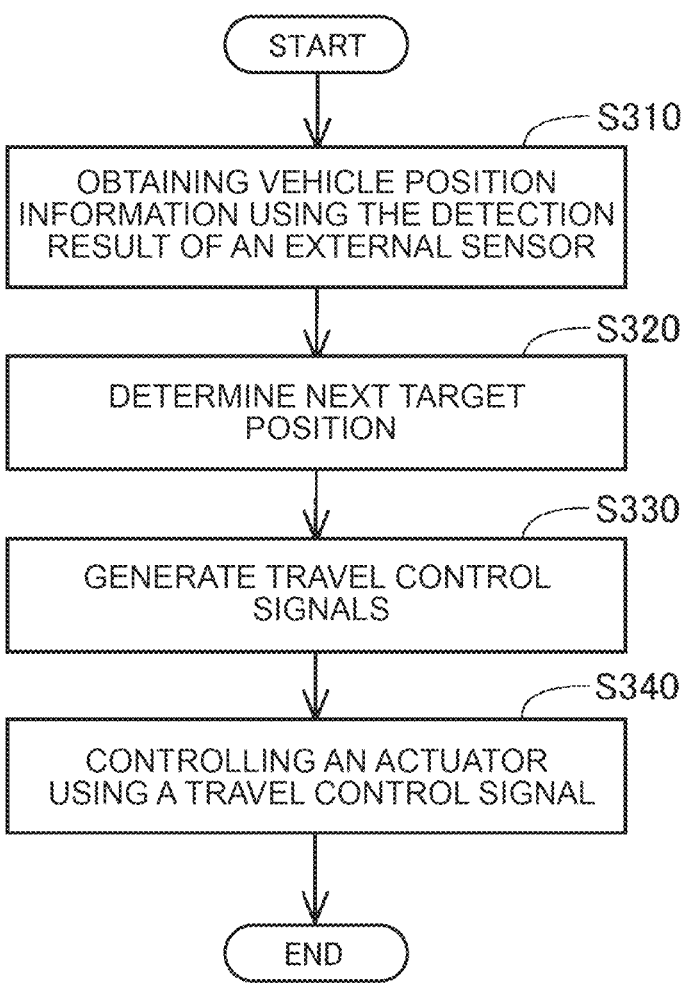
FIG. 7 is a flowchart showing the contents of the unmanned driving process according to the second embodiment.

FIG. 6 is an explanatory diagram illustrating a configuration of a system 10b according to the second embodiment. FIG. 7 is a flowchart showing the contents of the unmanned driving process according to the present embodiment. The difference between the present embodiment and the first embodiment is that the system 10b does not include the server device 200, that the vehicle 100 travels by autonomous control instead of remote control, and that the inspection process is executed by the vehicle 100. Other configurations are the same as those of the first embodiment unless otherwise described.

As illustrated in FIG. 6, in the present embodiment, the communication device 130 of the vehicle 100 can communicate with the external sensor group 300, the process management device 400, and the notification device 500 by wireless communication. The processor 111 of the vehicle control device 110 functions as a travel control unit 115 and an inspection unit 116 by executing a computer program PG1 stored in advance in the memory 112.

As illustrated in FIG. 7, in the present embodiment, the unmanned driving process is executed by the travel control unit 115. In S310, the travel control unit 115 acquires the position information of the vehicle 100 using the detection result outputted from the external sensor 301. In S320, the travel control unit 115 determines a target position at which the vehicle 100 is to be directed next. In the present embodiment, an ideal path is stored in advance in the memory 112. In S230, the travel control unit 115 generates a travel control signal for causing the vehicle 100 to travel toward the determined target position. In S240, the travel control unit 115 controls the actuator group 120 by using the generated travel control signal, thereby causing the vehicle 100 to travel at the acceleration and the steering angle represented by the travel control signal. The travel control unit 115 repeats acquisition of position information of the vehicle 100, determination of a target position, generation of a travel control signal, and control of the actuator group 120 at a predetermined cycle. According to system 10*b* of the present embodiment, the vehicle 100 can be driven by autonomous control of the vehicle 100 without remotely controlling the vehicle 100 from the outside.

The inspection process illustrated in FIG. 4 is executed by the inspection unit 116. In S210, the inspection unit 116 acquires the identification number of the target vehicle 100. In the present embodiment, the target vehicle 100 is the vehicle 100 itself. The inspection unit 116 acquires the identification number of the vehicle 100 itself stored in advance in the memory 112. In S220, the inspection unit 116 acquires information from the process management device 400 by using the identification number of the target vehicle 100, thereby specifying the progress of the manufacturing process of the target vehicle 100 at the current point in time. In S230, the inspection unit 116 acquires information from the process management device 400 by using the identification number of the target vehicle 100 and the progress of the manufacturing process, thereby specifying a component to be attached to the target vehicle 100 at the present time. In S240, the inspection unit 116 inspects the manufacturing status of the target vehicle 100 using at least one of the sensor information acquired from the external sensor group 300 and the electronic component information acquired from the electronic component 140.

In S250, the inspection unit 116 determines whether or not the inspection is successful. When it is determined that S250 has passed, the inspection unit 116 generates the order data of the component in S260, transmits the order data to the process management device 400, and then ends the inspection process. On the other hand, when it is determined that the vehicle is rejected in S250, the inspection unit 116 determines whether or not to stop the travel of the target vehicle 100 in S270.

When it is determined in S270 that the travel of the target vehicle 100 is to be stopped, the inspection unit 116 instructs the travel control unit 115 to stop the travel of the target vehicle 100 in S280, and notifies the administrator or the like that the travel of the target vehicle 100 has been stopped by using the notification device 500. Thereafter, the inspection unit 116 ends the inspection process. On the other hand, when it is not determined in S270 that the travel of the target vehicle 100 is to be stopped, the inspection unit 116 instructs the travel control unit 115 to change the destination of the target vehicle 100 in S290, and notifies the administrator or the like that the destination of the target vehicle 100 has been changed using the notification device 500. Thereafter, the inspection unit 116 ends the inspection process.

According to the above-described system 10*b* of the present embodiment, since the inspection unit 116 executes the inspection process, it is possible to inspect the manufacturing status of the vehicle 100 regardless of the worker or the dedicated facility, as in the first embodiment.

C. Other Embodiments (C1) In each of the above-described embodiments, in the inspection process, the inspection units 220, 116 inspect the manufacturing state of the vehicle 100 using the sensor information and the electronic component information. On the other hand, the inspection units 220, 116 may inspect the manufacturing state of the vehicle 100 using either the sensor information or the electronic component information.

(C2) In each of the above-described embodiments, in the inspection process, the vehicle 100 that has failed the inspection by the inspection units 220, 116 is stopped from moving or the destination is changed. On the other hand, the change of the movement destination may be performed without stopping the movement of the vehicle 100 that has failed the inspection by the inspection units 220, 116. The movement stop may be executed without changing the movement destination of the vehicle 100 that has failed the inspection by the inspection units 220, 116.

(C3) In each of the above-described embodiments, in the inspection process, when the target vehicle 100 passes the inspection, the inspection units 220, 116 generate the order data of the component such that the same component as the component is replenished at the place where the component is mounted on the target vehicle 100. On the other hand, when the target vehicle 100 passes the inspection, the inspection units 220, 116 may generate the order data of the component such that the same component as the component is replenished so as to be replenished to a predetermined location in a factory different from the location where the component is mounted on the target vehicle 100. The inspection units 220, 116 may not generate the order data of the component when the target vehicle 100 passes the inspection.

(C4) In each of the above-described embodiments, in the inspection process, when the target vehicle 100 fails the inspection, the inspection units 220, 116 execute the notification by the notification device 500. On the other hand, when the target vehicle 100 fails the inspection, the inspection units 220, 116 may not execute the notification by the notification device 500.

(C5) In each of the above-described embodiments, in the inspection process, the inspection units 220, 116 inspect the manufacturing state of the vehicle 100 a plurality of times in the manufacturing process of the vehicle 100, and the inspection items each time are made different according to the progress of the manufacturing process of the vehicle 100. On the other hand, the inspection units 220, 116 may not change the inspection item according to the progress of the manufacturing process. For example, when the inspection units 220, 116 inspect the manufacturing state of the vehicle 100 only once in the manufacturing process of the vehicle 100, the inspection items may not be different depending on the progress of the manufacturing process.

(C6) In each of the above-described embodiments, in the inspection process, the inspection units 220, 116 inspect the mounting state of the component in the vehicle 100. On the other hand, the inspection units 220, 116 may inspect the appearance state of the vehicle 100, for example, instead of the mounting state of the components in the vehicle 100. For example, the inspection units 220, 116 may inspect the presence or absence of scratches or coating unevenness in the vehicle 100. The inspection units 220, 116 may inspect not the state of the vehicle 100 but the state of the manufacturing process of the vehicle 100. For example, in the final inspection process, the inspection units 220, 116 may inspect whether or not an operation that is required to be performed by a qualified person is performed by a qualified person. For example, there is a rule that a badge is attached to a hat of a qualified worker, and a badge is not attached to a hat of an ineligible worker. In this case, by detecting the badge from the image acquired from the external sensor 301, the inspection units 220, 116 can inspect whether or not the work required to be performed by the qualified person is performed by the qualified person. The inspection units 220, 116 may include a database in which a face of a qualified person is registered. The inspection units 220, 116 may inspect whether or not the work required to be performed by the qualified person is performed by the qualified person using the face authentication technique.

(C7) In each of the above-described embodiments, the external sensor 301 is a camera, and the sensor information output from the external sensor 301 is an image. In contrast, the external sensor 301 may be a LiDAR. In this case, the sensor information is not an image but point cloud data. The remote control unit 210 and the travel control unit 115 may acquire the position information of the vehicle 100 using the point cloud data. The inspection units 220, 116 may inspect the manufacturing state of the vehicle 100 using the point cloud data. In this case, the sensor information acquired from the external sensor 301 is point cloud data. Note that the sensor information is not limited to the information acquired from the external sensor 301, and may be any information used for driving the vehicle 100 by unmanned driving. For example, when information acquired from an internal sensor mounted on the vehicle 100 is used to drive the vehicle 100 by unmanned driving, the sensor information may be information acquired from the internal sensor. The interior sensors may include, for example, cameras, LiDAR, acceleration sensors, yaw rate sensors.

(C8) In the first embodiment described above, the server device 200 is provided with the remote control unit 210 and the inspection unit 220. On the other hand, the server device 200 may be provided with the remote control unit 210, and the vehicle 100 may be provided with the inspection unit 220. In the above-described first embodiment, the server device 200 and the process management device 400 may be integrated. In the second embodiment described above, the vehicle 100 is provided with the travel control unit 115 and the inspection unit 116. In contrast, the vehicle 100 may be provided with the travel control unit 115, and the inspection unit 116 may be provided on a computer located outside the vehicle 100.

(C9) In the above-described first embodiment, the server device 200 executes processing from acquisition of position information of the vehicle 100 to generation of a travel control signal. On the other hand, the vehicle 100 may execute at least a part of the processing from the acquisition of the position information of the vehicle 100 to the generation of the travel control signal. For example, the following forms (1) to (3) may be used.

(1) The server device 200 may acquire the position information of the vehicle 100, determine a target position to which the vehicle 100 should be directed next, and generate a route from the current position of the vehicle 100 represented by the acquired position information to the target position. The server device 200 may generate a route to a target position between the current location and the destination, or may generate a route to the destination. The server device 200 may transmit the generated route to the vehicle 100. The vehicle 100 may generate a travel control signal so that the vehicle 100 travels on the route received from the server device 200, and control the actuator group 120 using the generated travel control signal.

(2) The server device 200 may acquire the position information of the vehicle 100 and transmit the acquired position information to the vehicle 100. The vehicle 100 may determine a target position to which the vehicle 100 should be heading next, and generate a route from the current position of the vehicle 100 represented by the received position information to the target position. Then, the vehicle 100 may generate a travel control signal so that the vehicle 100 travels on the generated route, and control the actuator group 120 using the generated travel control signal.

(3) In the above forms (1) to (2), an internal sensor may be mounted on the vehicle 100, and a detection result output from the internal sensor may be used for at least one of generation of a route and generation of a travel control signal. Inner sensors may include, for example, cameras, LiDAR, millimeter-wave radars, ultrasonic sensors, GPS sensors, accelerometers, gyroscopic sensors, and the like. For example, in the form (1), the server device 200 may acquire the detection result of the internal sensor and reflect the detection result of the internal sensor in the path when generating the path. In the form (1), the vehicle 100 may acquire the detection result of the internal sensor and reflect the detection result of the internal sensor in the travel control signal when generating the travel control signal. In the form (2), the vehicle 100 may acquire the detection result of the internal sensor and reflect the detection result of the internal sensor in the path when generating the path. In the form (2), the vehicle 100 may acquire the detection result of the internal sensor and reflect the detection result of the internal sensor in the travel control signal when generating the travel control signal.

(C10) In the second embodiment described above, the internal sensor may be mounted on the vehicle 100, and the detection result output from the internal sensor may be used for at least one of the generation of the route and the generation of the travel control signal. For example, the vehicle 100 may acquire the detection result of the internal sensor and reflect the detection result of the internal sensor on the route when generating the route. The vehicle 100 may acquire the detection result of the internal sensor and reflect the detection result of the internal sensor in the travel control signal when generating the travel control signal.

(C11) In the second embodiment described above, the vehicle 100 acquires the position information of the vehicle 100 using the detection result of the external sensor 301. On the other hand, an internal sensor is mounted in the vehicle 100, and the vehicle 100 may acquire the position information by using the detection result of the internal sensor. The vehicle 100 may determine a target position to which the vehicle 100 should be heading next, and generate a route from the current position of the vehicle 100 represented by the acquired position information to the target position. The vehicle 100 may generate a travel control signal for traveling on the generated route, and control the actuator group 120 using the generated travel control signal. In this case, the vehicle 100 can travel without using any detection result of the external sensor 301. Note that the vehicle 100 may acquire the target arrival time and the traffic jam information from the outside of the vehicle 100 and reflect the target arrival time and the traffic jam information on at least one of the route and the travel control signal. In addition, all of the functional configurations of the system 10 may be provided in the vehicle 100. That is, the processing implemented by the system 10 shown in the present disclosure may be implemented by the vehicle 100 alone.

(C12) In the above-described first embodiment, the server device 200 automatically generates a travel control signal to be transmitted to the vehicle 100. On the other hand, the server device 200 may generate a travel control signal to be transmitted to the vehicle 100 in accordance with a manual operation of an operator located outside the vehicle 100. For example, an operator may operate the control device. The control device may include a display for displaying an image output from the external sensor 301, a steering for remotely controlling the vehicle 100, an accelerator pedal, a brake pedal, and a communication device for communicating with the server device 200 through wired communication or wireless communication. The server device 200 may generate a travel control signal corresponding to an operation applied to the control device.

(C13) In each of the above-described embodiments, the vehicle 100 may have a configuration that can be moved by unmanned driving, and may be, for example, in the form of a platform having a configuration described below. Specifically, the vehicle 100 may include at least the vehicle control device 110 and the actuator group 120 in order to perform three functions of "running", "turning", and "stopping" by unmanned driving. When the vehicle 100 acquires information from the outside for unmanned driving, the vehicle 100 may further include a communication device 130. That is, the vehicle 100 that can be moved by the unmanned driving may not be equipped with at least a part of an interior component such as a seat or a dashboard. In the vehicle 100 that can be moved by unmanned driving, at least a part of an exterior component such as a bumper or a fender may not be attached, and the body shell may not be attached. In this instance, the remaining components, such as the body shell, may be mounted to the vehicle 100 until the vehicle 100 is shipped from the factory KJ. Alternatively, the remaining components, such as the body shell, may be mounted to the vehicle 100 after the vehicle 100 is shipped from the factory KJ with the remaining components, such as the body shell, not being mounted to the vehicle 100. Each component may be mounted from any direction, such as the upper side, lower side, front side, rear side, right side or left side of the vehicle 100. Alternatively, each component may be mounted from the same direction or from different directions. It should be noted that the position of the platform may be determined in the same manner as the vehicle 100 in each of the above-described embodiments.

(C14) The vehicle 100 may be manufactured by combining a plurality of modules. The module means a unit composed of a plurality of components arranged in accordance with a part or a function of the vehicle 100. For example, the platform of the vehicle 100 may be manufactured by combining a front module that constitutes a front portion of the platform, a central module that constitutes a central portion of the platform, and a rear module that constitutes a rear portion of the platform. The number of modules constituting the platform is not limited to three, and may be two or less or four or more. In addition to or instead of the components constituting the platform, the components constituting a part of the vehicle 100 different from the platform may be modularized. Further, the various modules may include any exterior parts such as bumpers and grilles, and any interior parts such as seats and consoles. In addition, not only the vehicle 100 but also a mobile body of an arbitrary mode may be manufactured by combining a plurality of modules. Such a module may be manufactured, for example, by joining a plurality of parts by welding, a fixture, or the like, or may be manufactured by integrally molding at least a part of the parts constituting the module as one part by casting. Molding techniques for integrally molding one part, in particular a relatively large part, are also called gigacasting or megacasting. For example, the front module, the central module, and the rear module described above may be manufactured using gigacasting.

(C15) In each of the above-described embodiments, the vehicle 100 is not limited to a passenger car, and may be, for example, a truck, a bus, a construction vehicle, or the like. The vehicle 100 is not limited to a four-wheeled vehicle, and may be, for example, a two-wheeled vehicle. The vehicle 100 is not limited to being driven by wheels, and may be driven by an infinite track.

(C16) Transporting the vehicle 100 by using the traveling of the vehicle 100 by the unmanned driving is also referred to as "self-propelled conveyance". A configuration for realizing self-propelled conveyance is also referred to as a "vehicle remote control autonomous traveling conveyance system". Further, a production method of producing the vehicle 100 by using self-propelled conveyance is also referred to as "self-propelled production". In self-propelled manufacturing, for example, at least a part of conveyance of the vehicle 100 is realized by self-propelled conveyance in a factory KJ that manufactures the vehicle 100.

The present disclosure is not limited to each of the above embodiments, and can be realized by various configurations without departing from the spirit thereof. For example, the technical features in the embodiments corresponding to the technical features in the respective aspects described in the SUMMARY can be appropriately replaced or combined in order to solve some or all of the above-described problems or to achieve some or all of the above-described effects. Further, when the technical features are not described as essential in the present specification, these can be deleted as appropriate.

What is claimed is:

1. A system comprising:

a control unit configured to control a mobile body movable by unattended driving by using sensor information acquired from a sensor; and an inspection unit configured to inspect a manufacturing status of the mobile body by using at least one of the sensor information and electronic component information acquired from an electronic component mounted on the mobile body.

2. The system according to claim 1, wherein the control unit is configured to change a movement destination of the mobile body based on an inspection result from the inspection unit.

3. The system according to claim 1, wherein the inspection unit is configured to determine progress of a manufacturing process for the mobile body and inspect an item corresponding to the progress.

4. The system according to claim 1, wherein the inspection unit is configured to identify a component to be mounted on the mobile body and make inspection as to whether the component to be mounted on the mobile body is mounted on the mobile body.

5. A method comprising:

controlling a mobile body movable by unattended driving by using sensor information acquired from a sensor; and inspecting a manufacturing status of the mobile body by using at least one of the sensor information and component information acquired from an electronic component mounted on the mobile body.

\* \* \* \* \*